Figure 1:
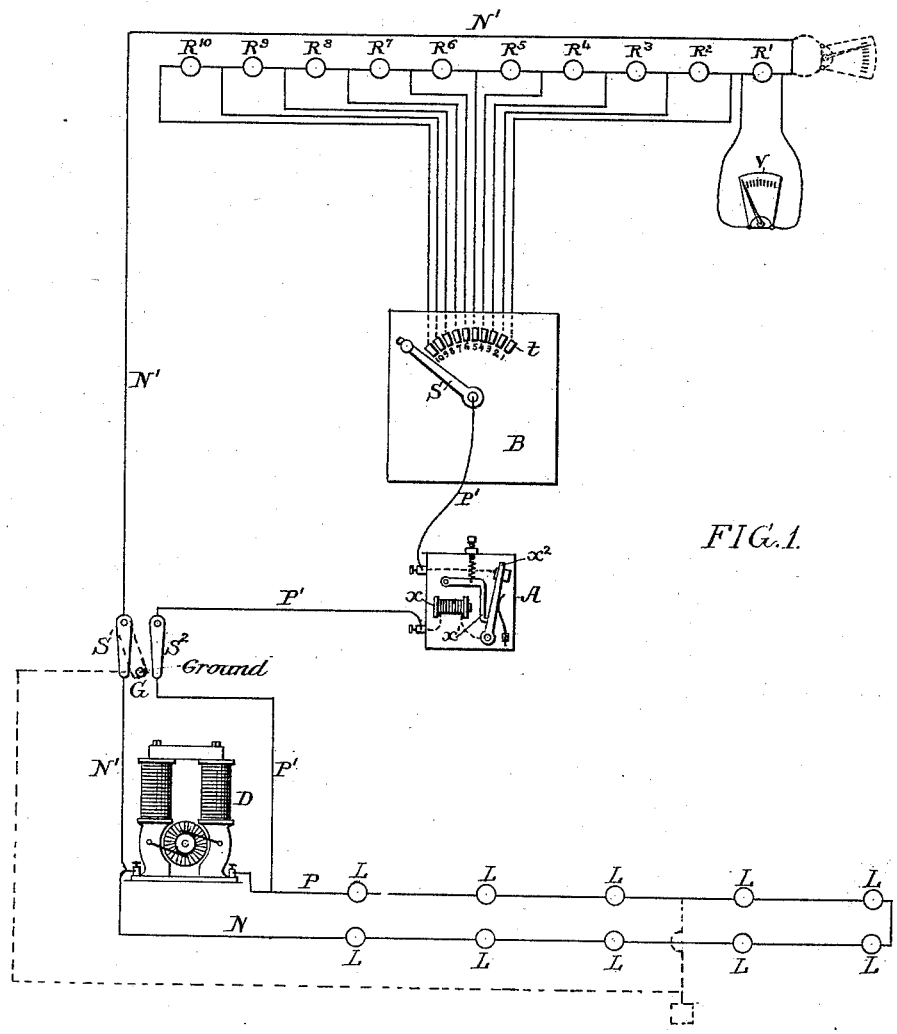

(No Model.)  2 Sheets—Sheet 1.

A. H. MANWAREN.
DEVICE FOR TESTING ARC LIGHT CIRCUITS.

No. 476,156.  Patented May 31, 1892.

Witnesses:
Alex. Barkoff
Hamilton D. Turner.

Inventor:
Albert H. Manwaren
by his Attorneys
Howson & Howson (No Model.) 2 Sheets—Sheet 2.
A. H. MANWAREN.
DEVICE FOR TESTING ARC LIGHT CIRCUITS.
No. 476,156. Patented May 31, 1892.
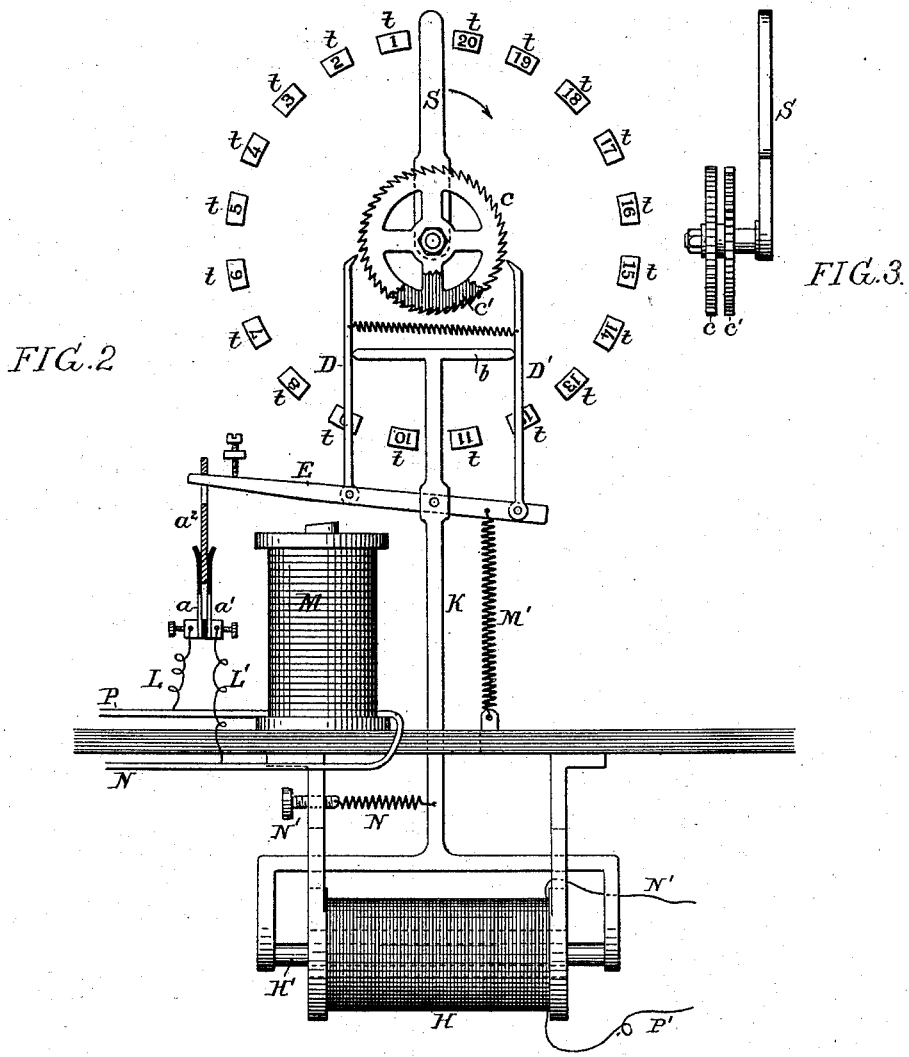
Witnesses:
Alex. Barkoff
Hamilton D. Turner.
Inventor:
Albert H. Manwaren
by his Attorneys
Howson & Howson

UNITED STATES PATENT OFFICE.

ALBERT H. MANWAREN, OF PHILADELPHIA, PENNSYLVANIA.

DEVICE FOR TESTING ARC-LIGHT CIRCUITS.

SPECIFICATION forming part of Letters Patent No. 476,156, dated May 31, 1892.

Application filed February 3, 1890. Serial No. 339,015. (No model.)

*To all whom it may concern:*

Be it known that I, ALBERT H. MANWAREN, a citizen of the United States, and a resident of Philadelphia, Pennsylvania, have invented certain Improvements in Devices for Testing Arc-Light Circuits, of which the following is a specification.

The object of my invention is to provide efficient means for testing arc-light circuits when in operation—that is to say, when the lights are in action—the object of the device being to determine the number of lamps in the circuit which are in action and to detect and locate grounds on the circuit. These objects I attain in the manner hereinafter set forth, reference being had to the accompanying drawings, in which—

Figure 1 is a diagram illustrating my improved means for testing arc-light circuits. Fig. 2 is a view on an enlarged scale, showing a preferable form of certain of the elements of the device; and Fig. 3 is a side view illustrating part of the device.

Referring in the first place to Fig. 1, D represents a dynamo-electric machine of any ordinary construction; P the positive wire, and N the negative wire, of the lighting-circuit, and L a series of arc lamps in this circuit. A shunt or test circuit is formed by the positive and negative wires P' N', connected, respectively, to the positive and negative wires of the main circuit, this shunt-circuit containing a number of resistances R' R² R³, &c., the terminals $t$ of which are arranged on a switchboard B, so that a switch S can be moved over the same, and thus cut out of circuit one resistance after another until any desired number of these resistances have been eliminated from the circuit.

In the shunt or test circuit is an automatic safety cut-off A, of any of the usual constructions, which has the effect of breaking the shunt or test circuit in the event of an excess of current—such, for instance, as would be likely to occur when in testing for a ground on the main lighting-circuit in the manner hereinafter set forth a ground connection chanced to be made when most of the resistances on the test-circuit were cut out.

The automatic cut-out shown consists of a magnet $x$ in the test-circuit, having an armature $x'$, which acts upon a switch $x^2$ and holds the same normally in position to close the test-circuit, but when attracted by the magnet releases said switch and permits it to move under the influence of a spring, so as to break the test-circuit, as will be readily understood.

In a shunt of the test-circuit, as in full lines, or in series with the last resistance, as shown by dotted lines, is a voltmeter V, and in connection with each of the wires P' N' of the shunt or test circuit is employed a switch S' or S², so that either side of the test-circuit can be connected with a ground G, for a purpose described hereinafter.

The resistances in the shunt or test circuit bear such relation to said circuit that each corresponds to one lamp in the main or lighting circuit, and when all the lamps are in action and all of the resistances are in the test-circuit the voltmeter V will indicate a certain standard strength of current in said test-circuit. If, however, one or more of the lamps in the main circuit fails to act, the equilibrium in the two circuits is disturbed and there is a variation from the standard strength of current in the test-circuit, which change is indicated by the voltmeter. If now the resistances in the test-circuit are successively cut out, the strength of current in said test-circuit will gradually approach the standard again until by the time as many resistances are cut out as there are lamps out of action the standard is again reached and is indicated by the voltmeter. In order to determine the number of lights in action on the circuit, therefore, the switch S is moved over the resistance-terminals on the switchboard B, so as to cut out the resistances successively until the voltmeter indicates the standard strength of current, the number of resistances remaining in the test-circuit at such time indicating the number of lamps in action in the lighting-circuit. The terminals of the resistances on the switchboard B are preferably numbered, so that the number of lamps burning in the circuit can be conveniently determined by reference to these numbers.

To locate a ground on the lighting-circuit, one side of the test-circuit—say the positive side P'—is connected to the positive wire of the lighting-circuit, and the negative wire N' of the test-circuit is connected with the ground at G by shifting the switch S', so as to cut out the direct connection with the wire N of the main circuit. The series of resistances are now interposed in a shunt or test around the arc lights on the positive wire between the dynamo and the grounding-point of said wire, and the number of lights between the dynamo and said ground is determined by cutting out the resistances in said test-circuit until the voltmeter indicates the standard strength of current, whereupon the number of resistances remaining in the test-circuit will indicate the number of lamps on the positive wire between the dynamo and the grounding point. The number of lamps between the dynamo and a grounding-point on the negative wire can be determined in the same manner by connecting the negative wire of the shunt-circuit to the negative wire of the lighting-circuit and grounding the positive wire P' by means of the switch $S^2$, so as to cut out the direct connection with the wire P.

Any desired form of resistance may be used in the shunt or test circuit; but I prefer to use for this purpose incandescent lamps as the cheapest and most convenient form.

In many cases it may be advisable to provide an automatic switch for cutting out the resistances in the test-circuit, and for this purpose I employ the device shown in Fig. 2, in which $t\,t$ represent the resistance-terminals on the switchboard B, and S the switch by the movement of which across said terminals the resistances are cut out in the manner before explained. This switch is carried by a shaft having two ratchet-wheels C C', Fig. 3, one right-handed and the other left-handed, and with these ratchet-wheels are adapted to engage pawls D D', carried by the opposite arms of an armature-lever E, which is controlled by an electro-magnet M, connected in series in the main lighting-circuit, the armature-lever being moved in one direction by the magnet when the latter is energized and being moved in the opposite direction by a spring M' when the current through the magnet is cut off.

An independent circuit can be formed by wires L L' and switch-plates $a$, $a'$, and $a^2$, the plates $a\,a'$ being connected to the wires L L' and the plate $a^2$ being raised and lowered by the action of the armature-lever E, the end of which plays in a slot in the plate, so as to permit a certain amount of lost motion and insure the desired extent of movement of said lever, the plate $a^2$ preferably sliding between non-conducting ends on the plates $a'\,a^2$, so as to be properly guided and frictionally supported during its movements and in its positions of rest. When the plate $a^2$ is elevated, so as to break the circuit between the plates $a\,a'$, the current passes through the magnet M and the armature is attracted. When it approaches the limit of its downward movement, however, the plate $a^2$ is depressed, so as to complete the circuit through the plates $a\,a'$ and wires L L', and the magnet is thus cut out, the armature being moved in the opposite direction by the spring M' until the plate $a^2$ is again raised and the circuit L $a\,a'$ L' again broken, so as to direct the current to the magnet. A constant vibrating movement is thus imparted to the armature-lever, and the pawls D D', carried thereby, constantly rise and fall. Said pawls are, however, under control of the T-head $b$ of an armature-lever K, which is hung to the same pivot as the armature-lever E and carries the core H' of a solenoid H, which is in series with the test-circuit or in a shunt around the last resistance precisely as is the voltmeter in the device shown in Fig. 1. The armature K is acted upon by a spring N, the tension of which can be regulated by means of a screw N', so that with the standard strength of current passing through the test-circuit the armature will be held in a central position by the solenoid, so as to cause its T-shaped end to hold both of the pawls D D' out of engagement with their ratchet-wheels. More than the standard strength of current in the test-circuit will, however, cause a movement of the solenoid-core in one direction and less than the standard strength of current will cause movement of said core in the other direction, so as to throw one or the other of the pawls into action. If, therefore, on closing the test-circuit the number of lamps in action in the main circuit is less than the number of resistances in the test-circuit, the strength of current in the test-circuit will vary from the standard, and the solenoid-core H' will be moved so as to swing the armature K and permit the pawl D to come into engagement with its ratchet-wheel C, thereby turning the switch S in the direction of the arrow and cutting out one after another of the resistances until the strength of current in the test-circuit accords with the standard, whereupon the core of the solenoid and the armature K will be restored to the mid-position, so as to throw the pawl D out of action. In like manner if, on closing the test-circuit, the switch S is in such a position that the number of lamps in action is greater than the number of resistances remaining in the test-circuit the solenoid core and armature will be moved in the contrary direction, so as to permit the pawl D' to engage with its ratchet, and thus impart a backward movement to the switch S, thus bringing more resistances into the test-circuit until the strength of current again accords with the standard and the solenoid-core is again restored to mid-position. The solenoid H thus performs in the combination a function similar to that of the voltmeter, besides governing the automatic operation of the switch.

Although I prefer to employ a resistance in the test-circuit for each lamp in the lighting-circuit, as before set forth, each of said resistances may, if desired, represent a group of two or more lamps, the testing in this case, however, not being as accurate as when each lamp is represented by a resistance in the test-circuit.

Having thus described my invention, I claim and desire to secure by Letters Patent—

1. The combination of the main or arc light circuit, the shunt or test circuit containing a series of resistances, a switch for putting said resistances in or cutting them out of said test-circuit, and a voltmeter or equivalent device whereby the proper adjustment of said switch is determined, one terminal of said meter being connected to the positive wire of the shunt-circuit and the other terminal to the negative wire of said shunt, substantially as specified.

2. The combination of the main or arc light circuit, the shunt or test circuit, a series of resistances therein, a switch for throwing said resistances in or cutting them out of the circuit, a voltmeter or equivalent device for determining the adjustment of said switch, one terminal of said meter being connected to the positive wire of the shunt-circuit and the other terminal to the negative wire of said shunt, and switches for grounding either side of said test-circuit independently of the voltmeter, substantially as specified.

In testimony whereof I have signed my name to this specification in the presence of two subscribing witnesses.

ALBERT H. MANWAREN.

Witnesses:
EUGENE ELTERICH,
HARRY SMITH.